United States Patent
Takahashi et al.

(10) Patent No.: US 10,886,803 B2
(45) Date of Patent: Jan. 5, 2021

(54) AXIAL GAP-TYPE ROTARY ELECTRICAL MACHINE

(71) Applicant: Hitachi Industrial Equipment Systems Co., Ltd., Tokyo (JP)

(72) Inventors: Shuuichi Takahashi, Tokyo (JP); Yasuei Yoneoka, Tokyo (JP); Toshifumi Suzuki, Tokyo (JP); Toru Sakai, Tokyo (JP); Katsuyuki Yamazaki, Tokyo (JP); Daisaku Takahashi, Tokyo (JP); Daisuke Kurai, Tokyo (JP); Jun Sakurai, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 38 days.

(21) Appl. No.: 16/329,837

(22) PCT Filed: Jan. 31, 2017

(86) PCT No.: PCT/JP2017/003408
§ 371 (c)(1),
(2) Date: Mar. 1, 2019

(87) PCT Pub. No.: WO2018/142463
PCT Pub. Date: Aug. 9, 2018

(65) Prior Publication Data
US 2019/0245418 A1 Aug. 8, 2019

(51) Int. Cl.
*H02K 21/24* (2006.01)
*H02K 1/18* (2006.01)
(Continued)

(52) U.S. Cl.
CPC ........... *H02K 1/2793* (2013.01); *H02K 1/182* (2013.01); *H02K 16/02* (2013.01); *H02K 21/24* (2013.01);
(Continued)

(58) Field of Classification Search
CPC ...... H02K 3/46; H02K 2203/12; H02K 1/182; H02K 21/24; H02K 16/02; H02K 1/2793
(Continued)

(56) References Cited

U.S. PATENT DOCUMENTS

| 7,221,073 B2* | 5/2007 | Yamada | H02K 21/24 310/216.105 |
| 7,569,958 B2* | 8/2009 | Matsuzaki | H02K 3/524 310/71 |

(Continued)

FOREIGN PATENT DOCUMENTS

| CN | 1543042 A | 11/2004 |
| CN | 1905315 A | 1/2007 |

(Continued)

OTHER PUBLICATIONS

Chinese-language Office Action issued in Chinese Application No. 201780045965.4 dated Mar. 31, 2020 with an English translation(13 pages).

(Continued)

*Primary Examiner* — Burton S Mullins
(74) *Attorney, Agent, or Firm* — Crowell & Moring LLP

(57) ABSTRACT

This axial gap-type rotary electrical machine has: a stator in which a plurality of core units each configured from a core, a coil, and a bobbin are disposed, centered around a rotating shaft, in an annular shape along the inner circumferential surface of a housing; and a rotor that is face-to-face with a cross-sectional surface of the core through a predetermined gap in a radial direction of the rotating shaft. The bobbin is formed in a cylindrical shape, has flange parts extending a predetermined amount in the outer circumferential direction at the top and bottom of the cylindrical shape, is provided with notch sections on the tip part in the inner circumferential direction of the flange part of the bobbin, and forms an acute angle. In addition, approximately circular notch (Continued)

sections are formed on adjacent side surface portions of the bobbin in the outer circumferential direction of the bobbin. Accordingly, when forming the stator by means of molding, a resin mold is made to easily flow, and damage to the bobbin of the core unit can be avoided.

4 Claims, 14 Drawing Sheets

(51) Int. Cl.
    *H02K 16/02*     (2006.01)
    *H02K 1/27*     (2006.01)
    *H02K 15/12*     (2006.01)
    *H02K 3/52*     (2006.01)

(52) U.S. Cl.
    CPC ............ *H02K 3/522* (2013.01); *H02K 15/12* (2013.01); *H02K 2203/12* (2013.01)

(58) Field of Classification Search
    USPC ........................................................ 310/194
    See application file for complete search history.

(56) References Cited

U.S. PATENT DOCUMENTS

| | | | | |
|---|---|---|---|---|
| 7,608,954 B2 * | 10/2009 | Kojima | ................... | H02K 1/14 310/45 |
| 7,667,368 B2 * | 2/2010 | Matsuzaki | ............ | H02K 3/524 310/194 |
| 10,454,325 B2 * | 10/2019 | Takahashi | .............. | H02K 1/182 |
| 10,630,120 B2 * | 4/2020 | Sakai | ..................... | H02K 1/182 |
| 2004/0164641 A1 | 8/2004 | Yamada et al. | | |
| 2007/0001540 A1 | 1/2007 | Matsuzaki et al. | | |
| 2015/0349588 A1 * | 12/2015 | Tokoi | ..................... | H02K 3/522 310/208 |
| 2016/0268866 A1 * | 9/2016 | Matsumoto | .......... | H02K 15/022 |
| 2018/0254680 A1 * | 9/2018 | Sakurai | ................ | H02K 15/105 |

FOREIGN PATENT DOCUMENTS

| | | | | |
|---|---|---|---|---|
| CN | 105684269 A | 6/2016 | | |
| JP | 58-86851 A | 5/1983 | | |
| JP | 2-103752 U | 8/1990 | | |
| JP | 2005-51929 A | 2/2005 | | |
| JP | 2007-6699 A | 1/2007 | | |
| WO | 2013099343 A1 * | 7/2013 | ............. | H02K 3/521 |
| WO | WO 2015/075813 A1 | 5/2015 | | |
| WO | 2015159418 A1 * | 10/2015 | ............... | H02K 3/46 |
| WO | WO 2016/170608 A1 | 10/2016 | | |

OTHER PUBLICATIONS

International Search Report (PCT/ISA/210) issued in PCT Application No. PCT/JP2017/003408 dated Apr. 4, 2017 with English translation (five (5) pages).

Japanese-language Written Opinion (PCT/ISA/237) issued in PCT Application No. PCT/JP2017/003408 dated Apr. 4, 2017 (five (5) pages).

* cited by examiner

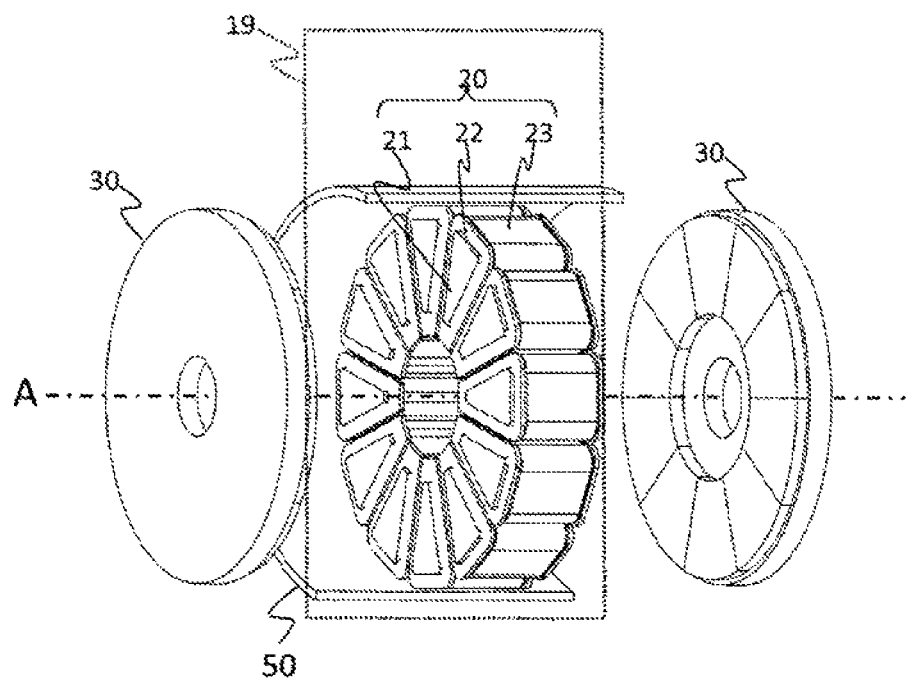

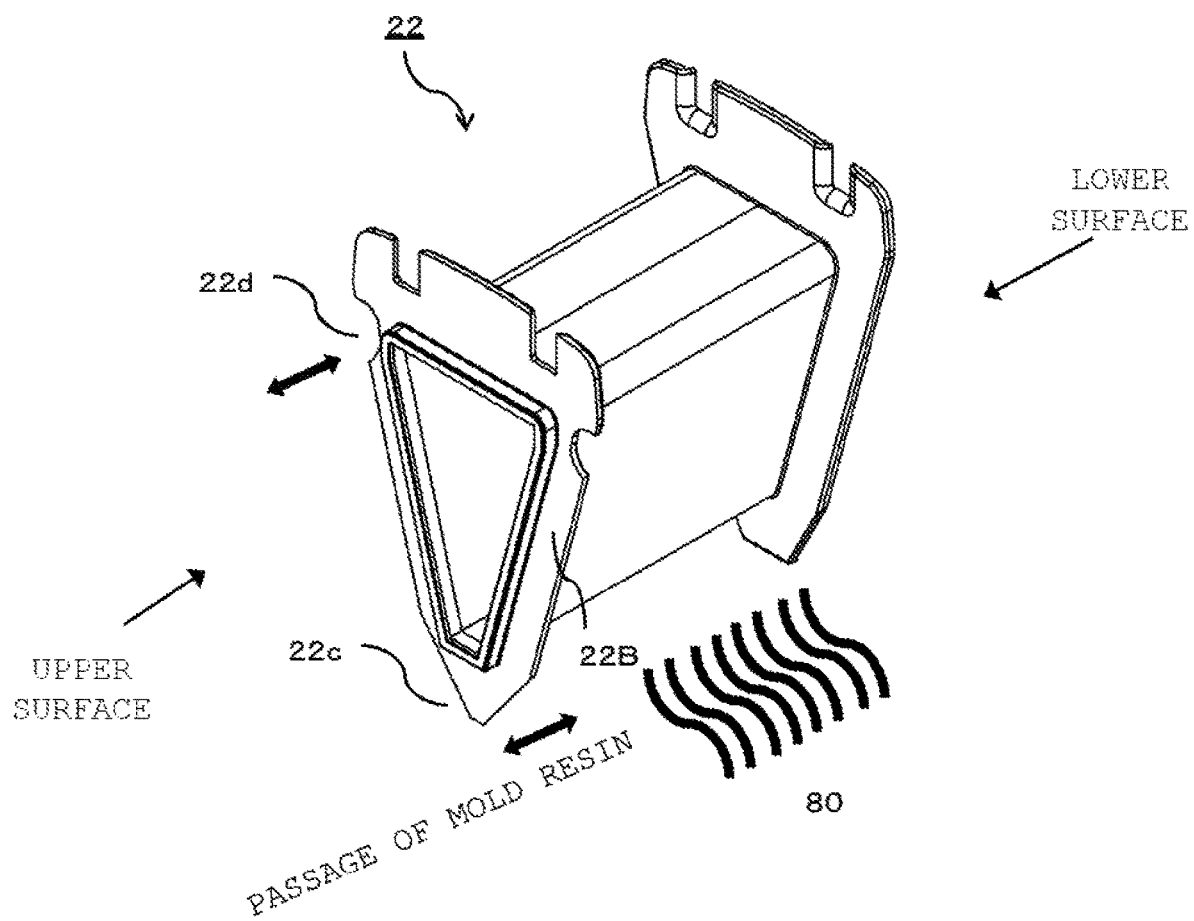

AXIAL GAP-TYPE ROTARY ELECTRICAL MACHINE

TECHNICAL FIELD

The present invention relates to an axial gap-type rotary electrical machine, and more particularly to an axial gap-type rotary electrical machine suitable for use in molding a stator.

BACKGROUND ART

The axial gap-type rotary electrical machine is a machine in which a cylindrical stator and a disk-shaped rotor are disposed to be face-to-face with each other via a predetermined air gap in a radial direction of the rotary shaft. The stator includes a plurality of iron cores disposed to be warped in an inner circumferential direction of a housing portion, and a coil wound around the iron core. In the axial gap-type rotary electrical machine, since a gap surface generating the torque increases in proportion to approximately the square of a diameter thereof, it is considered to be a rotary electrical machine suitable for a high efficiency and a thin shape, compared to a radial gap type of a mechanism with a gap in the radial direction.

In particular, since a double rotor type axial gap-type rotary electrical machine in which a single stator is sandwiched by two rotors can secure a twice gap area, it has attracted attention as a structure capable of obtaining superior characteristics. In the double rotor type axial gap-type rotary electrical machine, since the iron core and the coil are arranged independently, in some cases, they are supported and fixed to the housing with mold resin.

For example, Patent Document 1 discloses a technique of integrating a plurality of core units and molding them by resin molding (paragraph number 0006). Further, a protrusion 703 is provided in the vicinity of a center of an outermost circumference of the core unit in the mold 700 (paragraph number 0025, FIG. 5). When a resin 800 is cured, it is possible to ensure the insulation property corresponding to the deviation from the sealing pressure of the resin by a recessed portion 802 to be formed (paragraph number 0034, FIG. 7).

CITATION LIST

Patent Document

Patent Document 1: International Publication No. WO 2016/170608

SUMMARY OF THE INVENTION

Problems to be Solved by the Invention

In Patent Document 1, when forming the resin mold, a feature is given to a mold so that deviation of the core unit can be prevented by the shape of the resin to be formed by the mold.

Generally, in many cases, thermosetting resins may be used when molding by the resin molding. When such a resin is used, in the latter half of the resin enclosing process, in order to start curing of the previously injected resin and to fill the resin to every corner, it is necessary to seal the resin with high pressure.

When forming the stator by molding, an axial gap-type rotary electrical machine capable of being easily manufactured by making the resin mold flow easily is desired.

Solutions to Problems

The axial gap-type rotary electrical machine according to the present invention is preferably an axial gap-type rotary electrical machine including: a stator in which a plurality of core units formed by a core, a coil and a bobbin is arranged annularly along an inner circumferential surface of a housing around a rotary shaft; and a rotor being face-to-face with an end surface of the core via a predetermined gap in a radial direction of the rotary shaft, in which the bobbin has a flange portion having a cylindrical shape and extending upward and downward from the cylindrical shape by a predetermined amount over an outer circumferential direction, and a notch section is provided on a side surface in the vicinity of an inner circumferential direction or an outer circumferential direction of the flange portion of the bobbin.

Also, preferably, the notch section has an acute angle and is provided at a tip of the flange portion of the bobbin in the inner circumferential direction.

Further, preferably, the notch section has a substantially semicircular shape or a substantially semi-elliptical shape, and is provided on a side surface portion in the vicinity of the flange portion of the bobbin in the outer circumferential direction.

Effects of the Invention

According to the present invention, it is possible to provide an axial gap-type rotary electrical machine which makes it easy for the resin mold to flow when molding the stator, thereby avoiding breakage of a bobbin of a core unit.

BRIEF DESCRIPTION OF THE DRAWINGS

FIG. 1B is a schematic configuration diagram of the axial gap-type rotary electrical machine according to the first embodiment (part 2).

FIG. 5 is a perspective view of a bobbin according to the first embodiment.

MODE FOR CARRYING OUT THE INVENTION

Hereinafter, each embodiment to which the present invention is applied will be described with reference to FIGS. 1A to 9.

First Embodiment

First, an overall configuration of an axial gap-type rotary electrical machine according to the first embodiment will be described with reference to FIGS. 1A and 1B.

Figure 1A:
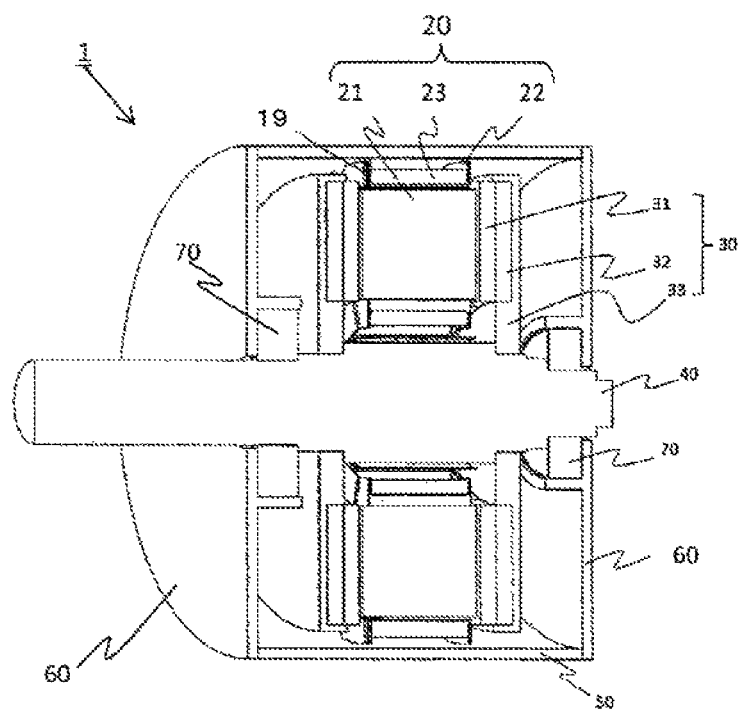
FIG. 1A is a schematic configuration diagram of an axial gap-type rotary electrical machine according to a first embodiment (part 1).

The cross-sectional view of FIG. 1A illustrates a schematic configuration of a double rotor type axial gap-type permanent magnet synchronous motor 1 (hereinafter, in some cases, referred to simply as a "motor 1") according to the first embodiment.

As illustrated in FIG. 1A, in the motor 1, two disk-shaped rotors 30 are disposed to be face-to-face with each other so that a donut-shaped stator 19 disposed along an inner circumferential surface of a housing 50 is interposed via a predetermined air gap in a radial direction of a rotary shaft.

In a rotor 30, a center of a disk is fixed to a rotary shaft 40. Further, the rotary shaft 40 is disposed to penetrate a central portion of a stator 19, and both end portions thereof are rotatably fixed to an end bracket 60 via a bearing 70. Further, the end bracket 60 is fixed to the vicinity of both open end portions of the substantially cylindrical housing 50.

Furthermore, the rotor 30 is provided with a permanent magnet 31 in a circular yoke 33 via a rotor base 32. The permanent magnet 31 is made up of a plurality of flat plate-like magnets having a substantially sectorial shape centered on a direction of the rotary shaft 40, and magnets of different polarities are arranged in the rotating direction. Further, ferrite is applied as the permanent magnet 31, but it is not limited thereto. For example, a configuration in which the yoke 33 is omitted may be adopted.

An armature configuration of the motor 1 is as illustrated in the perspective view of FIG. 1B. The stator 19 includes twelve core units 20 arranged along the inner circumference of the housing 50 with a rotation axis A as a center direction. The single core unit 20 constitutes one slot. In addition, the core units 20 and the inner circumferential surface of the housing 50 are molded integrally with each other by resin molding, and are fixed to the stator (which will be described later).

Next, the configuration of the rotor according to the related art will be described with reference to FIGS. 2A and 2B.

Figure 2A:
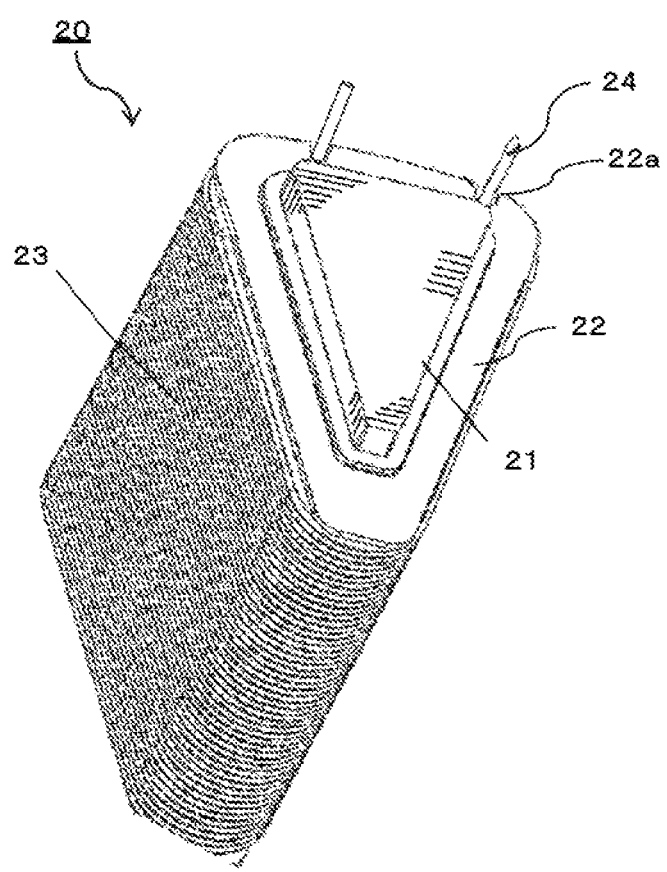
FIG. 2A is a perspective view of a core unit according to a related art.

As illustrated in FIG. 2A, the core unit 20 includes a bobbin 22, a core 21, and a coil 23. The core 21 is an amorphous metal which contains iron as a main constituent having a substantially trapezoidal shape or a triangular prismatic shape formed by sequentially laminating metal plates, which are molded so that the width gradually increases, in the radial direction. In addition to the substantially trapezoidal shape or the substantially triangular shape, the cross-sectional shape of the core 21 may be a cross section having two oblique sides having intersecting points in an extending direction. As the metal plate to be laminated, iron or the like may be used, but in the present embodiment, amorphous-containing metals are thinned into a tape shape, and are sequentially laminated while increasing the width in the rotating direction, thereby obtaining the core 21.

Figure 2B:
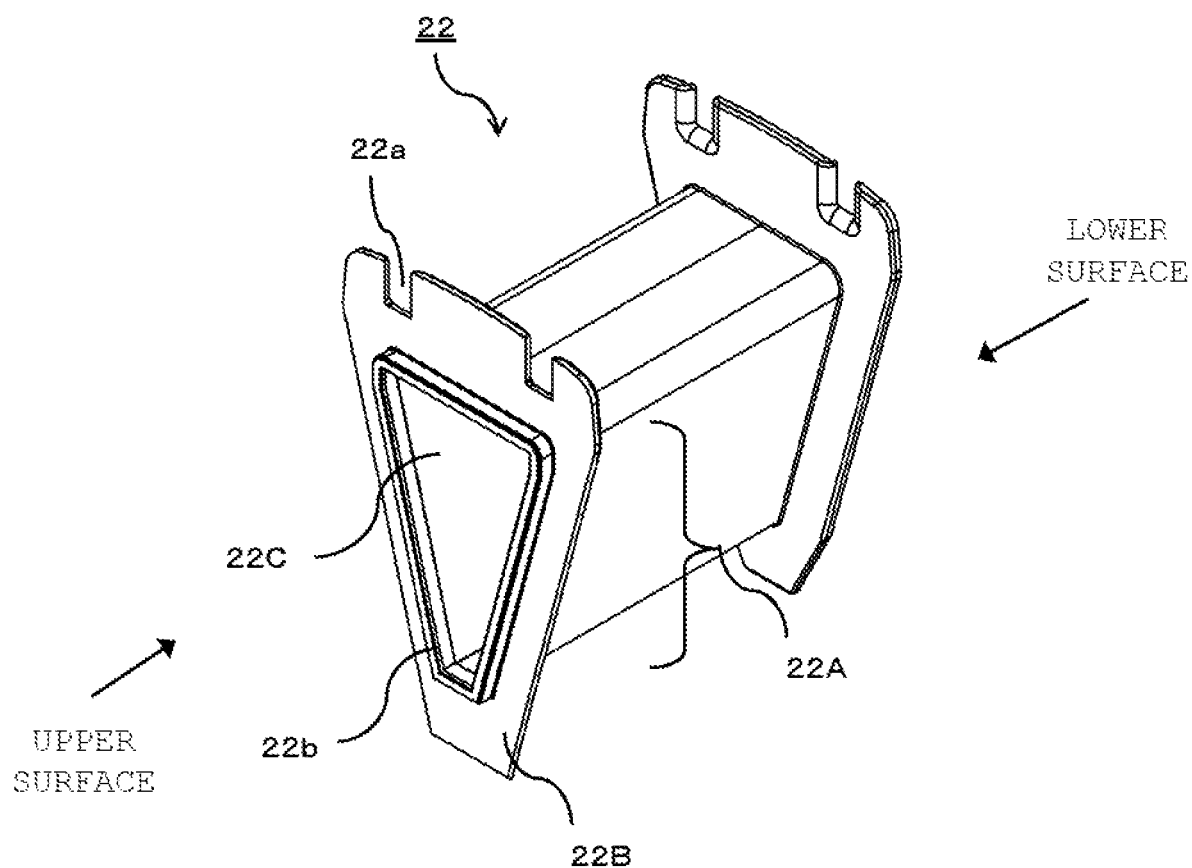
FIG. 2B is a perspective view of a bobbin according to the related art.

As illustrated in the perspective view of FIG. 2B, the bobbin 22 has a trapezoidal cylindrical main body portion 22A having an inner cylindrical portion 22C having an inner diameter substantially matching the shape of the outer circumference of the laminated iron core having a trapezoidal column shape, and a flange portion 22B provided at both end portions of the main body portion 22A and extending in the entire circumferential direction perpendicular to an outer cylindrical portion of the main body portion 22A by a predetermined length. The main body portion 22A has a length capable of covering both end portions of the outer circumference of the core 21 (that is, both end portions of the rotation axis A in the extending direction on the outer circumference), when the laminated iron core is inserted into the inner cylindrical portion 22C having an inner diameter approximately equal to or slightly greater than the outer diameter of the core 21. Various materials can be applied as the bobbin 22, as long as it is possible to ensure insulation between the coil and the iron core, but in general, the bobbin 22 is provided by resin molding. When the bobbin 22 is made of a resin material, it is an important subject to mold the bobbin to withstand the sealing pressure at the time of resin molding.

Notch sections 22a provided in the outer circumferential direction of the flange portion 22B is for drawing out a lead wire 24 of the coil. Further, a convex portion 22b having a protrusion with a constant width in the vertical direction is formed to surround the outer circumference of the inner cylindrical portion 22C of the main body portion 22A.

As illustrated in FIG. 2A, the core unit 20 is configured so that the core 21 is inserted on the inner diameter side of the main body 22A of the bobbin 22, and the coil 23 is wound around the outer circumference of the main body 22A and between the flange portions 22B of the both ends.

Next, the aspect of the resin molding process formed integrally with the core units 20 and the inner circumference of the housing 50 will be described with reference to FIGS. 3 and 4.

Figure 3:
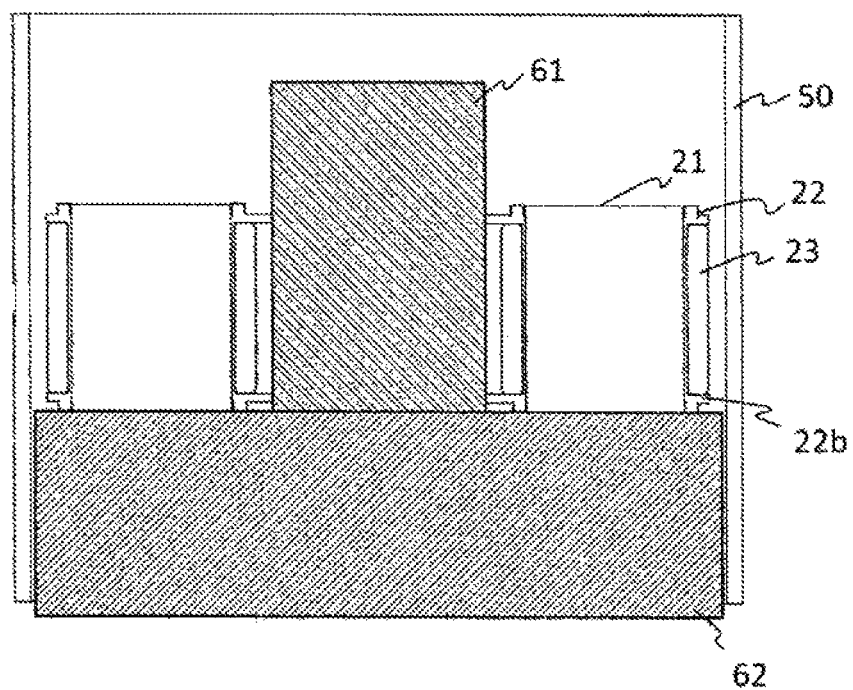
FIG. 3 is a view illustrating a state of resin molding of a stator.
Figure 4:
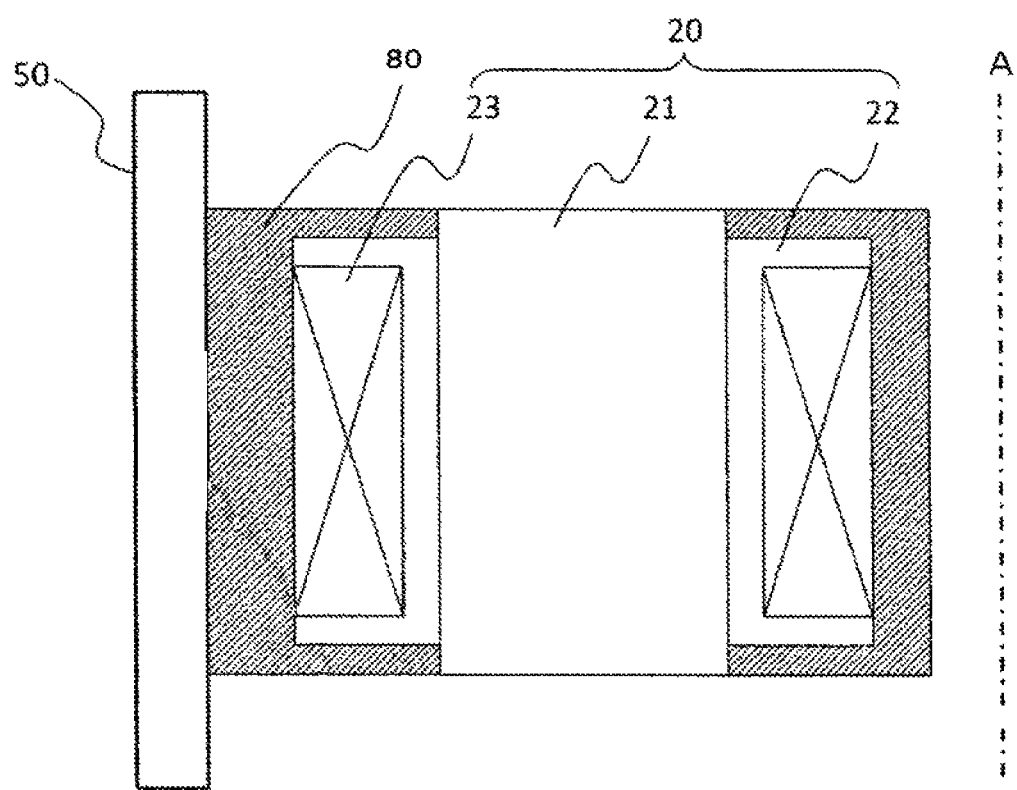
FIG. 4 is an enlarged view of a main part of resin molding of the stator.

As illustrated in FIG. 3, when performing the resin molding integrally with the core units 20 and the inner circumference of the housing 50, the housing 50 is inserted into the lower mold 62 with which an inner diameter of the housing 50 substantially coincides, and a cylindrical intermediate mold 61 for forming an axial core space for allowing the rotary shaft to penetrate later is arranged at the center of a lower mold 62 from the opposite side opening of the housing 50. The core unit 20 is arranged annularly around the intermediate mold 61. At this time, the flange portion 22B of the bobbin is adapted to perform positioning in the radial direction and positioning in the rotating direction of the rotary shaft with the adjacent core unit 20.

Thereafter, an upper mold having an outer diameter substantially coinciding with the inner diameter of the housing 50 and having a cylindrical space at the center to allow the intermediate mold 61 to penetrate is inserted from the housing opening on the side opposite to the lower mold 62, and sandwiches and supports the core unit 20. Thereafter, the mold resin 80 is sealed from the facing surfaces of the upper mold and the lower mold 62. As illustrated in FIG. 4, the mold resin 80 is filled between the core units 20, on the inner circumferential surface of the housing 50, the direction of the intermediate mold 61, and the surface of the flange portion 22B of the bobbin facing the rotor 30, without gaps. As the mold resin 80, a thermosetting unsaturated polyester resin (for example, a bulk molding compound (BMC)) having low molding shrinkage and high dimensional stability is usually used.

Next, the shape of the bobbin according to the first embodiment will be described with reference to FIGS. 5 to 7C.

In a bobbin 22 according to the present embodiment, notch sections 22d having a substantially semicircular shape or a substantially semielliptical shape are formed in both directions of a side surface close to the outer circumferential direction of the flange portion 22B on the upper surface, and notch sections 22c are formed at a tip portion of the flange portion 22B of the lower surface in the inner circumferential direction and have an acute angle. Here, as illustrated in FIG. 3, the direction opposite to a mold 62 is the lower surface of the bobbin 22, and a direction opposite thereto, that is, a direction in which the mold resin 80 is drawn is the upper surface of the bobbin 22.

Figure 6A:
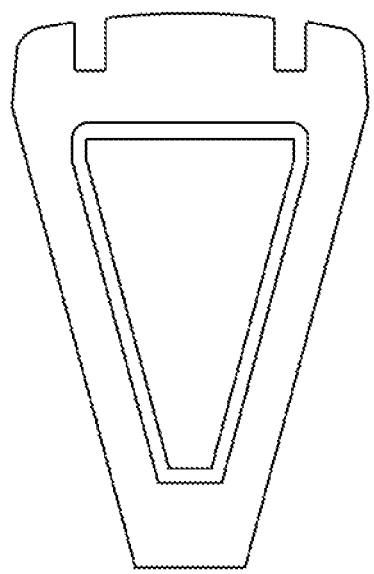
FIG. 6A is a top view of a bobbin according to the related art.
Figure 6B:
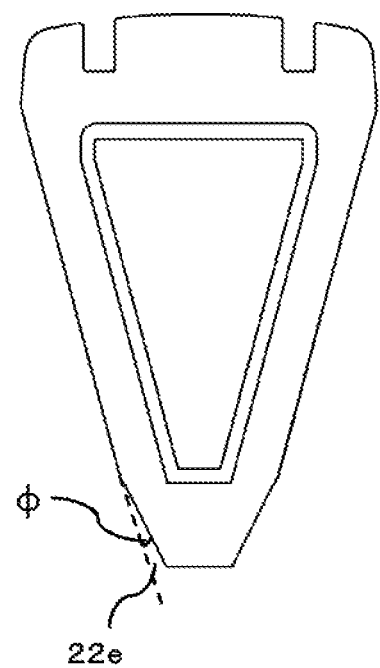
FIG. 6B is a bottom view of the bobbin according to the related art.

When a mold resin 80 is filled with high pressure, the mold resin 80 is gradually filled from the portion of the lower surface to the upper surface, and the sealing pressure is maximized in the vicinity of the flange portion 22B on the upper surface of the bobbin 22. There is a possibility that the bobbin 22 may be broken due to resin (plastic) molding. Therefore, in the present embodiment, in order to secure the flow path of the mold resin 80 and reduce the sealing pressure in the vicinity of the flange portion 22B of the upper surface of the bobbin 22 at the final stage of molding, the notch sections 22d are formed on the side surface close to the outer circumferential direction of the flange portion 22B, and the acute-angled notch sections 22c are provided at the tip portion of the flange portion 22B on the lower surface in the inner circumferential direction (the top view of the bobbin according to the related art of FIG. 6A is compared with the top view of the bobbin according to this embodiment of FIG. 7A).

Figure 7A:
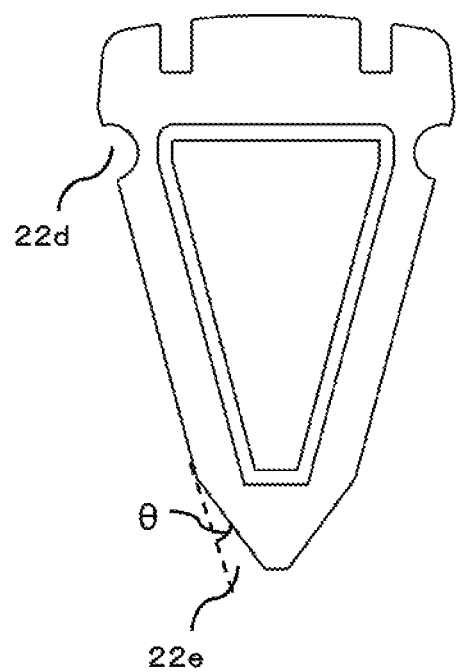
FIG. 7A is a top view of the bobbin according to the first embodiment (part 1).

Although the notch section 22d has a semicircular shape in FIG. 7A, it may have a semielliptical shape or a shape of a hole in which about half of a square or a rectangle is formed.

Although the notch section 22e of the flow path for allowing the mold resin 80 to pass is also formed in the flange portion 22B of the lower surface of the related art, the notch section 22c of the present embodiment is more obtuse. That is, when an incision angle of the notch section 22e of the bobbin of the related art is defined as φ, and an incision angle of the notch section 22c of the bobbin of the present embodiment is defined as θ, it is desirable that a relation of φ<θ holds.

Figure 7B:
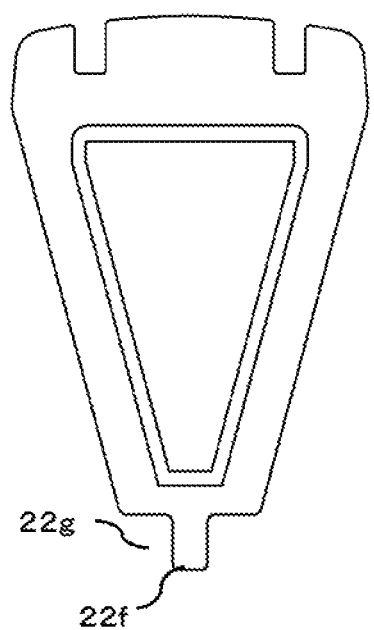
FIG. 7B is a top view of the bobbin according to the first embodiment (part 2).

Further, as illustrated in FIG. 7B, notch sections 22g are provided at both ends of the tip of the bobbin 22 in the inner circumferential direction and a convex portion 22f is formed at the tip so that a flow path for allowing the mold resin 80 to flow is secured.

Figure 7C:
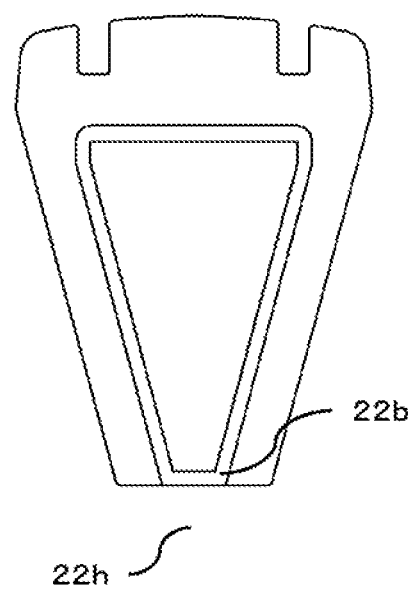
FIG. 7C is a top view of the bobbin according to the first embodiment (part 3).

Further, as illustrated in FIG. 7C, notch sections 22h abutting against the lower side of the convex portion 22b are provided at the tip of the bobbin 22 in the inner circumferential direction, the entire flange portion 22B of the upper surface is formed in a substantially trapezoidal shape, and the shape of the bobbin in the direction of the rotation axis is formed in a straight shape so that a flow path for allowing the mold resin 80 to pass may be secured.

Second Embodiment

Figure 8:
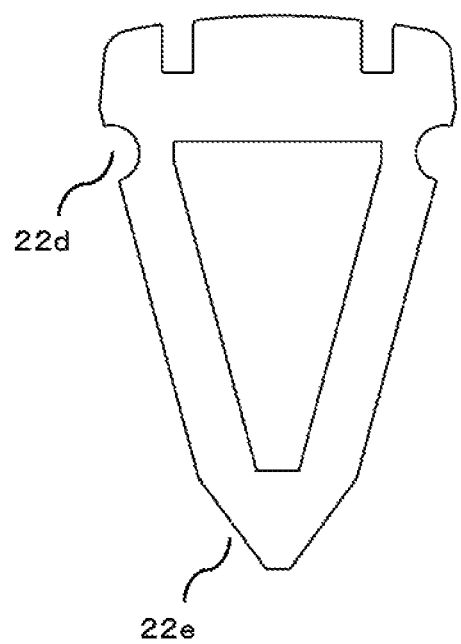
FIG. 8 is a top view of a bobbin according to a second embodiment.
Figure 9:
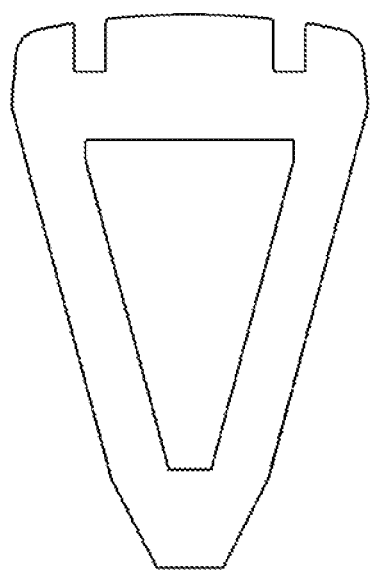
FIG. 9 is a bottom view of the bobbin according to the second embodiment.

Next, a second axial gap-type rotary electrical machine will be described with reference to FIGS. 8 and 9.

In the present embodiment, the shape of the bobbin of the first embodiment is changed, and other portions are similar.

In the shape of the bobbin 22 of this embodiment, a convex portion 22b having a protrusion of a fixed width in the vertical direction is not formed to surround the outer circumference of the inner cylindrical portion 22C of the main body portion 22A. The notch section 22c and the notch section 22d are provided in the flange portion 22B of the upper surface in the same manner as in the first embodiment. The convex portion 22b is not formed in the flange portion 22B on the lower surface, and the notch section 22e for the flow path of the mold resin 80 is not formed.

As described above, according to the shape of the bobbin of the axial gap-type rotary electrical machine of the present embodiment, it is possible to reduce the risk of breakage of the bobbin at the time of molding the stator, thereby improving the productivity.

REFERENCE SIGNS LIST

1 Motor
19 Stator
20 Core unit
21 Core
22 Bobbin
22A Main body portion
22B Flange portion
22C Inner cylindrical portion
22a, 22c to 22g, 22h Notch section
22b, 22f Convex portion
23 Coil
24 Lead wire
30 Rotor
31 Permanent magnet
32 Rotor base
33 Yoke
40 Rotary shaft
50 Housing
60 End bracket
70 Bearing

The invention claimed is:

1. An axial gap-type rotary electrical machine comprising:
 a stator in which a plurality of core units formed by a core, a coil and a bobbin is arranged annularly along an inner circumferential surface of a housing around a rotary shaft; and
 a rotor face-to-face with an end surface of the core via a predetermined gap in a radial direction of the rotary shaft,
 wherein the bobbin has a flange portion having a cylindrical shape and extending upward and downward from the cylindrical shape by a predetermined amount over an outer circumferential direction, and
 a notch section provided on a side surface in the vicinity of an inner circumferential direction or an outer circumferential direction of the flange portion of the bobbin,
 wherein a notch section is provided at both the tip portion in the inner circumferential direction of the flange portion corresponding to an upper surface of the bobbin at the time of molding and the tip portion in the inner circumferential direction of the flange portion corresponding to a lower surface of the bobbin at the time of molding, and
 a notch angle of the notch section of the tip portion in the inner circumferential direction of the flange portion corresponding to the upper surface of the bobbin at the time of molding is larger than a notch angle of the notch section of the tip portion in the inner circumferential direction of the flange portion corresponding to the lower surface of the bobbin at the time of molding.

2. The axial gap-type rotary electrical machine according to claim 1, wherein the notch section has an acute angle and is provided at a tip of the flange portion of the bobbin in the inner circumferential direction.

3. The axial gap-type rotary electrical machine according to claim 1, wherein the notch section on a side surface in the vicinity of the flange portion of the bobbin in the outer circumferential direction has a substantially semicircular shape or a substantially semi-elliptical shape.

4. An axial gap-type rotary electrical machine comprising:
a stator in which a plurality of core units formed by a core, a coil and a bobbin is arranged annularly along an inner circumferential surface of a housing around a rotary shaft; and
a rotor face-to-face with an end surface of the core via a predetermined gap in a radial direction of the rotary shaft,
wherein the bobbin has a flange portion having a cylindrical shape and extending upward and downward from the cylindrical shape by a predetermined amount over an outer circumferential direction, and a convex portion surrounding an outer circumference of an inner cylindrical portion of the bobbin and having protrusions of constant width in a vertical direction, and
a notch section provided at a tip portion of the flange portion of the bobbin in the inner circumferential direction, and a shape of the notch section on a rotary shaft side of the bobbin is formed in a linear shape to be coplanar with the convex portion.

* * * * *